US006986018B2

(12) United States Patent
O'Rourke et al.

(10) Patent No.: US 6,986,018 B2
(45) Date of Patent: Jan. 10, 2006

(54) METHOD AND APPARATUS FOR SELECTING CACHE AND PROXY POLICY

(75) Inventors: Bret P. O'Rourke, Kirkland, WA (US); Dawson F. Dean, Redmond, WA (US); Chih-Kan Wang, Redmond, WA (US); Mark D. Van Antwerp, Redmond, WA (US); David J. Roth, Seattle, WA (US); Chadd B. Knowlton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 09/893,373

(22) Filed: Jun. 26, 2001

(65) Prior Publication Data
US 2002/0198953 A1 Dec. 26, 2002

(51) Int. Cl.
G06F 12/00 (2006.01)

(52) U.S. Cl. ............... 711/213; 709/202; 709/203; 709/205; 709/217; 709/213; 709/227; 711/118; 711/121; 711/133; 711/147

(58) Field of Classification Search ............... 711/133, 711/118, 147, 121; 709/203, 202, 205, 217, 709/229, 213
See application file for complete search history.

(56) References Cited

U.S. PATENT DOCUMENTS

| 5,262,964 | A | 11/1993 | Bonsall et al. |
| 5,737,619 | A | 4/1998 | Judson |
| 5,740,549 | A | 4/1998 | Reilly et al. |
| 5,859,660 | A | 1/1999 | Perkins et al. |
| 5,941,951 | A | 8/1999 | Day et al. |
| 5,951,646 | A | 9/1999 | Brandon |
| 5,974,503 | A | 10/1999 | Venkatesh et al. |
| 5,991,306 | A * | 11/1999 | Burns et al. ................ 370/429 |
| 5,996,015 | A | 11/1999 | Day et al. |
| 6,023,731 | A | 2/2000 | Chawla |
| 6,141,693 | A | 10/2000 | Perlman et al. |
| 6,298,373 | B1 * | 10/2001 | Burns et al. ................ 709/203 |
| 6,314,451 | B1 | 11/2001 | Landsman et al. |
| 6,345,256 | B1 | 2/2002 | Milsted et al. |
| 6,354,903 | B1 | 3/2002 | Nelson |
| 6,361,326 | B1 | 3/2002 | Fontana et al. |
| 6,366,914 | B1 | 4/2002 | Stern |
| 6,389,467 | B1 | 5/2002 | Eyal |
| 6,412,011 | B1 | 6/2002 | Agraharam et al. |
| 6,553,404 | B2 | 4/2003 | Stern |

(Continued)

OTHER PUBLICATIONS

"CircusTalk: An Orchestration Service for Distributed Multimedia", Gutfreund et al., Distributed Multi-Media Applications Project, GTE Laboratories, Inc., 8 pgs.

(Continued)

Primary Examiner—Mano Padmanabhan
Assistant Examiner—Mehdi Namazi
(74) Attorney, Agent, or Firm—Lee & Hayes, PLLC

(57) ABSTRACT

A cache server includes a media serving engine that is capable of distributing media content. A cache engine is coupled to the media serving engine and capable of caching media content. A set of cache policies is accessible by the cache engine to define the operation of the cache engine. The cache server can be configured to operate as either a cache server or an origin server. The cache server also includes a data communication interface coupled to the cache engine and the media serving engine to allow the cache engine to receive media content across a network and to allow the media serving engine to distribute media content across the network. The cache policies include policies for distributing media content from the media server, policies for handling cache misses, and policies for prefetching media content.

26 Claims, 7 Drawing Sheets

U.S. PATENT DOCUMENTS

| | | |
|---|---|---|
| 6,557,001 B1 | 4/2003 | Dvir et al. |
| 6,564,263 B1 | 5/2003 | Bergman et al. |
| 6,574,609 B1 | 6/2003 | Downs et al. |
| 6,581,102 B1 | 6/2003 | Amini et al. |
| 2001/0014103 A1 * | 8/2001 | Burns et al. ............... 370/429 |
| 2001/0019658 A1 | 9/2001 | Barton et al. |
| 2002/0059643 A1 | 5/2002 | Kitamura et al. |
| 2002/0131496 A1 | 9/2002 | Vasudevan et al. |
| 2002/0138844 A1 | 9/2002 | Otenasek et al. |

OTHER PUBLICATIONS

"Downloading and Stream Conversion: Supporting Interactive Playout of Videos in a Client Station", Chen et al., IBM Research Division, Thomas Watson Research Center, New York, IEEE 1995, pp. 73-80.

Shulman, Matthew, Advanced Systems Format Specification, Microsoft Digital Media Division, Feb. 2001, 18 pages.

Ayars et al, Synchronized Multimedia Integration Language (SMIL 2.0) Specification, W3C Proposed Recommendation, Jun. 2001, 16 pages.

Microsoft Europe, "Advanced Systems Format (ASF) Specification," Feb. 2001, 19 pages.

Roth, Dave, "Windows Media Services Hercules Release: Cache & Proxy," Microsoft Corporation, 2000, 25 pages.

Hilal, Randa, "A Survey on MPEG-7 A Multimedia Content Description Interface," prepared for Prof. Javed I. Khan, Dept. of Computer Science, Kent State University, Nov. 2001, 24 pages.

* cited by examiner

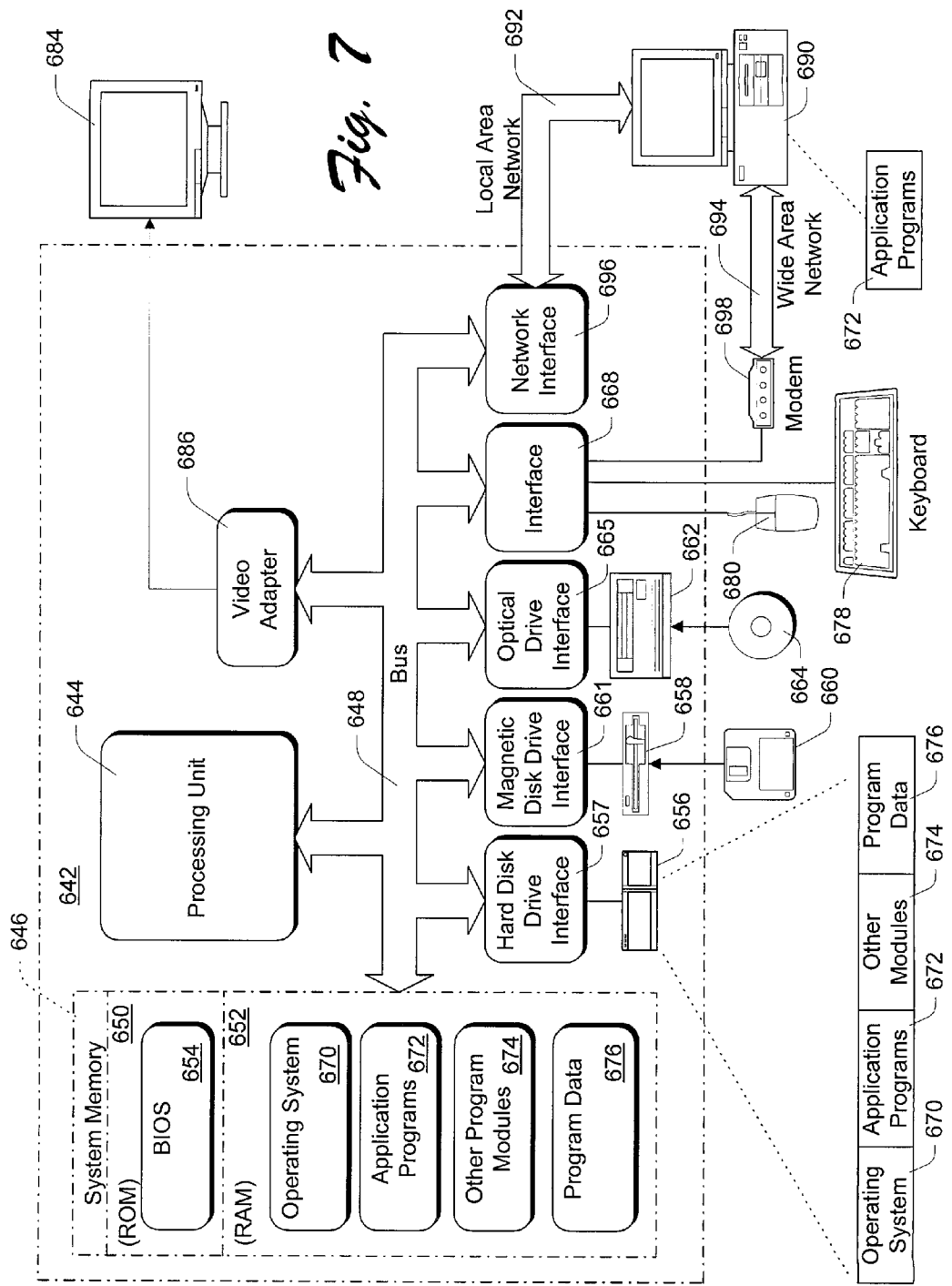

METHOD AND APPARATUS FOR SELECTING CACHE AND PROXY POLICY

TECHNICAL FIELD

The present invention relates to media systems and, more particularly, to the handling of cache and proxy policies in a cache server.

BACKGROUND

Media distribution systems distribute media content, such as audio data or video data, from an origin server to one or more clients via a data communication network. The data communication network may include, for example, a local area network (LAN) or a wide area network (WAN). The origin server is the source of the media content, including both live media content and pre-recorded media content. A particular type of media distribution system, referred to as a streaming media system, distributes real-time data from an origin server to one or more clients requesting the real-time data. Increased bandwidth through the data communication network improves the audio or video quality of the distributed media in the case of real-time data. If one or more low bandwidth communication links exist in the network connecting the origin server to the client, then the quality of the real-time media presentation is reduced. In this situation, the client may attempt to retrieve the media from a different server, referred to as a cache server or a proxy server, which is connected to the client using higher bandwidth communication links. The cache or proxy server retrieves the content from the origin server and distributes the content to one or more clients via a faster communication link.

FIG. 1 illustrates an environment 100 in which a client can request and receive content (such as streaming video content) from a cache server and/or an origin server. A client 102 is coupled to a network 104, such as the Internet, via a communication link 114. A cache server 106 is coupled to client 102 via a communication link 112 and coupled to network 104 via a communication link 118. Cache server 106 includes a storage disk 108 for storing data, such as cached media content for distribution to client 102. An origin server 110 is coupled to network 104 via a communication link 116.

Typically, the communication links to network 104 (i.e., communication links 114, 116, and 118) are relatively slow connections (e.g., 64 k bits per second) and provide low quality real-time video images. In contrast, communication link 112 between client 102 and cache server 106 is generally a faster connection (e.g., 100 M bits per second) provided by a LAN or other high-speed network.

When client 102 wants to receive media content, a request is issued to cache server 106. If the cache server 106 has cached a copy of the requested media content, then the cache server transmits the content across communication link 112 to client 102.

Cache server 106 receives its stored media content from one or more origin servers 110. Typically, cache server 106 downloads content from origin server 110 at a relatively low speed. However, once the content is downloaded, the cache server 106 can distribute the content to many local clients via a high-speed network connection, such as communication link 112. The cache server 106 may save the downloaded content to serve future client requests for the content without having to download the content from the origin server 110. If cache server 106 does not contain the content requested by the client 102, then the client must retrieve the desired content from the origin server 110.

Existing cache servers are manufactured with a substantially fixed architecture that is difficult to customize. A particular manufacturer may provide several different cache server models with different features, but the architecture of each model provides minimal opportunity for customization. A cache server customer is forced to select a cache server model that is "closest" to their cache requirements. Since different cache users are likely to have different cache requirements, no single cache server can satisfy the needs of all users. Depending on the cache server features and the customer's requirements, the cache server may not be capable of meeting all of the customer's cache requirements. These existing cache servers perform various cache-related functions that are controlled by a set of cache policies that are determined by the manufacturer. These existing cache servers that define both the cache-related functions and the policies for implementing those functions minimize the opportunities for a customer to modify the cache server to meet their specific needs.

The system described herein addresses these limitations by providing a single cache server that can operate as either an origin server or a cache server. The system includes a flexible architecture that separates the various cache functions from the policies that determine which functions are to be performed in a particular situation. This flexible architecture allows a common cache server to be configured in a variety of different ways depending on the set of policies applied to the cache server. Thus, different manufacturers or end users can create different cache server functionality based on the set of policies selected.

SUMMARY

The system and methods described herein provide a cache server that is capable of performing various cache-related functions under the direction of a set of user-configurable cache policies. This cache server architecture allows the same cache server to operate in different ways depending on the specific set of cache policies.

In one embodiment, a media serving engine is provided to distribute media content. A cache engine, which is coupled to the media serving engine, caches media content. A set of cache policies is accessible by the cache engine to define the operation of the cache engine.

In a described embodiment, the apparatus can be configured to operate as a cache server.

A particular embodiment also includes a data communication interface coupled to the cache engine and the media serving engine. The data communication interface allows the cache engine to retrieve media content across a network and allows the media serving engine to distribute media content across a network.

In another embodiment, the cache policies include policies for distributing media content, handling cache misses, and prefetching media content.

In one embodiment, a request for media content is received by a media server from a client. A determination is made as to whether the cache server is functioning as a cache server or an origin server. The request for media content is processed according to a set of cache policies if operating as a cache server. The requested media content is provided to the client if the cache server is operating as an origin server and contains the requested media content.

BRIEF DESCRIPTION OF THE DRAWINGS

FIG. 7 illustrates an example of a suitable operating environment in which the invention may be implemented.

DETAILED DESCRIPTION

The system and methods described herein provide a cache server that performs a variety of cache-related functions. The operation of the cache server is determined by a set of cache policies that are determined by the user of the cache server. Thus, the same cache server is capable of meeting the cache requirements of a variety of users because each user or manufacturer can configure the cache policies to meet their specific needs.

Figure 1:
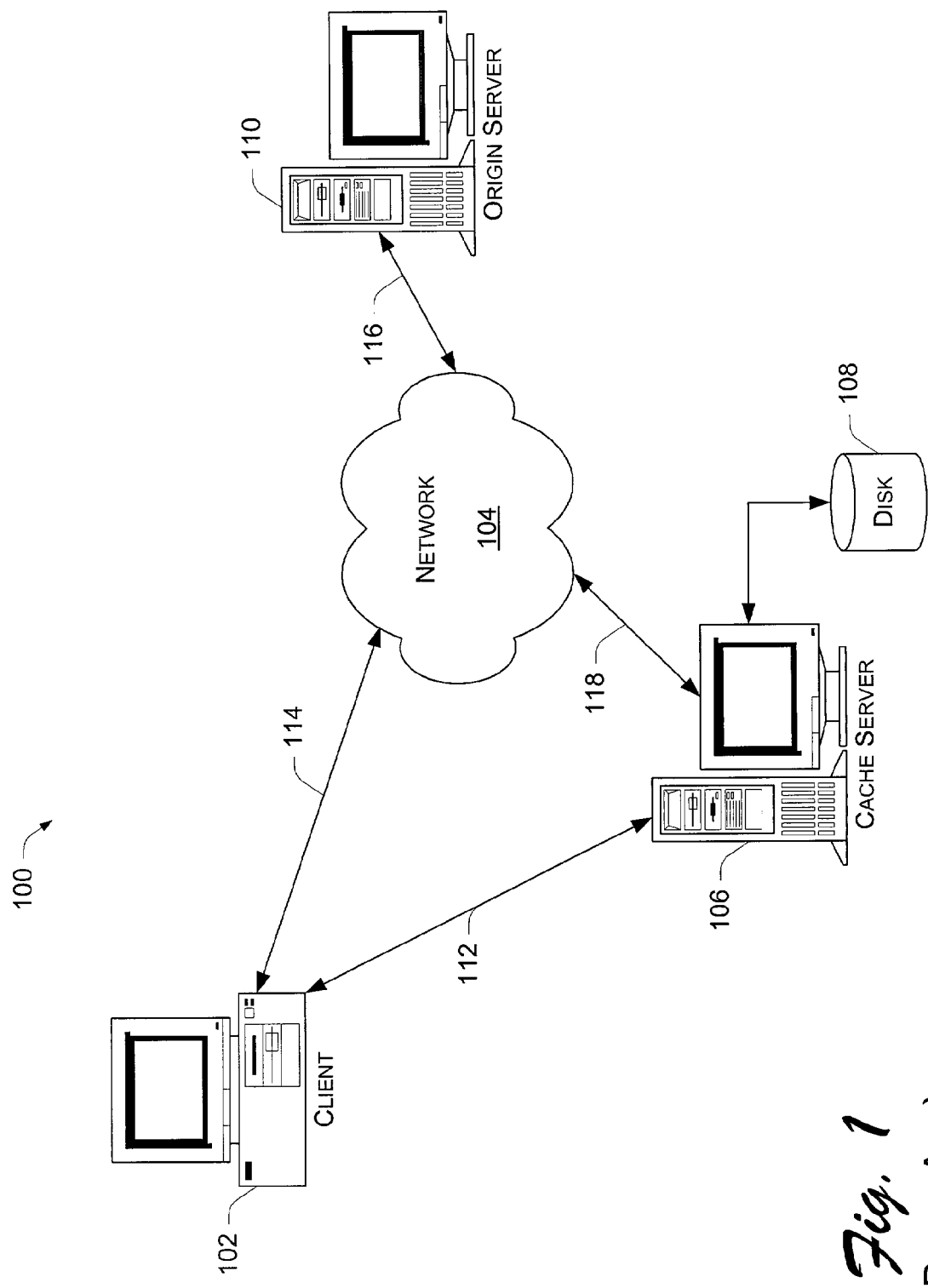
FIG. 1 illustrates an environment in which a client can request and receive content from a cache server and/or an origin server.
Figure 2:
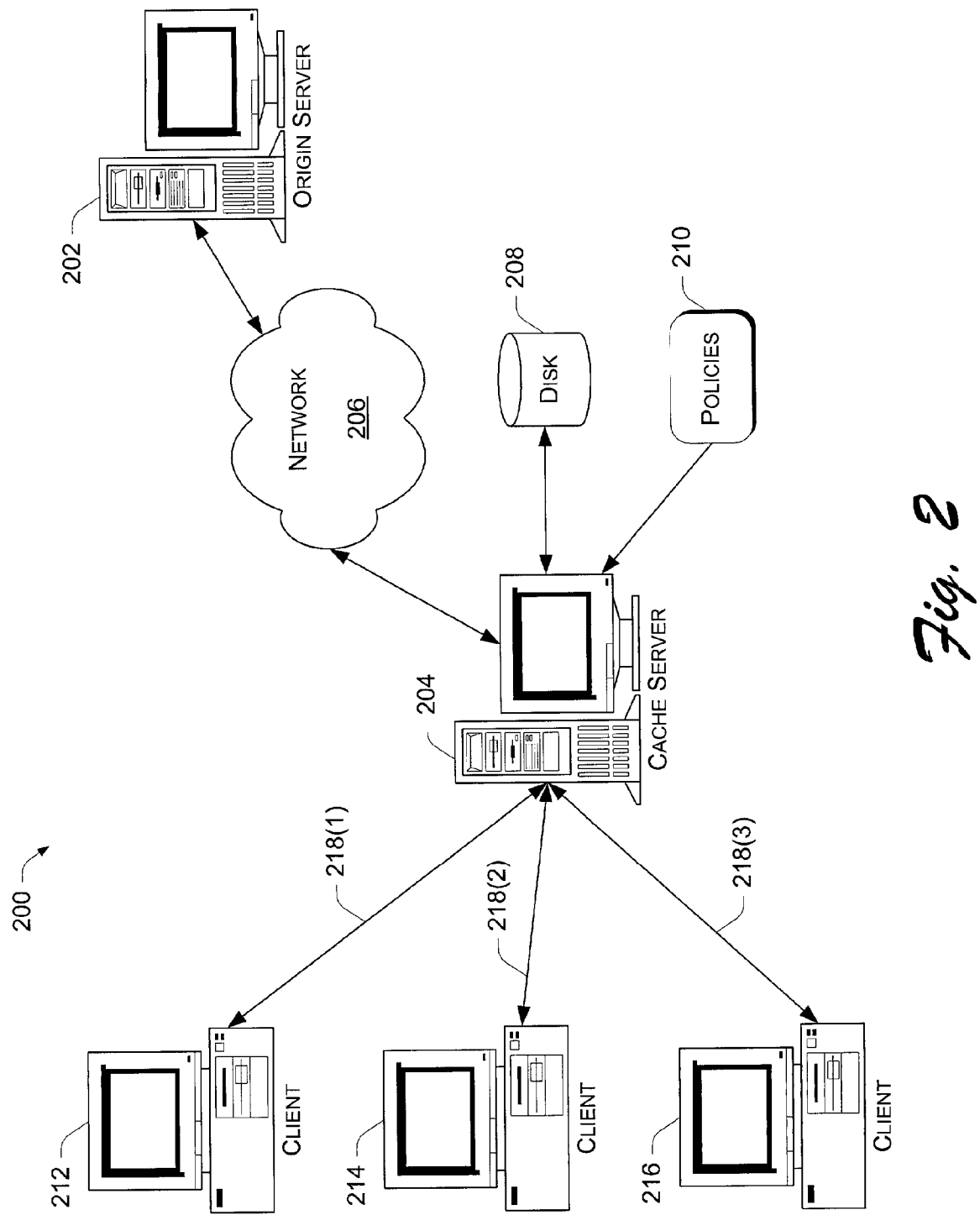
FIG. 2 illustrates an example environment in which multiple clients can request and receive content from a cache server and/or an origin server.

FIG. 2 illustrates an example environment 200 in which multiple clients 212, 214, and 216 can request and receive content from a cache server 204 In this example, each client 212–216 is coupled to cache server 204 via a high-speed LAN connection 218. Cache server 204 is coupled to an origin server 202 via a network 206, such as the Internet. Cache server 204 is also coupled to a disk storage device 208, which stores various data, including cached media content (such as media content received from origin server 202). Cache server 204 receives a set of cache policies 210 (also referred to as "policy plug-ins"), which define what functions the cache server performs in certain situations.

Origin server 202 stores various pre-recorded media content, such as movies, television programs, concerts, sporting events, and the like. This pre-recorded media content may be distributed to one or more cache servers (such as cache server 204) for redistribution to one or more clients 212–216. Although the distribution of the media content to cache server 204 is via a slow communication link, the cache server 204 is able to redistribute the media content to multiple local clients at a significantly faster rate, thereby providing a higher quality real-time video image to the local clients.

Origin server 202 may also receive live broadcast streams, such as news events, press conferences, live sporting events, and the like. These live broadcast streams can be distributed to cache server 204 via network 206. Cache server 204 may then redistribute the broadcast streams to one or more clients that have requested the broadcast stream. Thus, a single transmission of the broadcast stream to cache server 204 can satisfy the requests of multiple clients coupled to the cache server, thereby reducing the burden on the origin server 202 and reducing the traffic across network 206.

In the example of FIG. 2, origin server 202 may be a dedicated origin server or may be a cache server (similar to cache server 204) that is capable of functioning as either an origin server or as a cache server. If origin server 202 is a cache server, then it is configured in FIG. 2 as an origin server.

FIG. 2 illustrates a single origin server 202, a single cache server 204, and three clients 212–216. However, it will be appreciated that alternate embodiments may include any number of origin servers, any number of cache servers, and any number of clients, all coupled to one another via one or more data communication networks.

Figure 3:
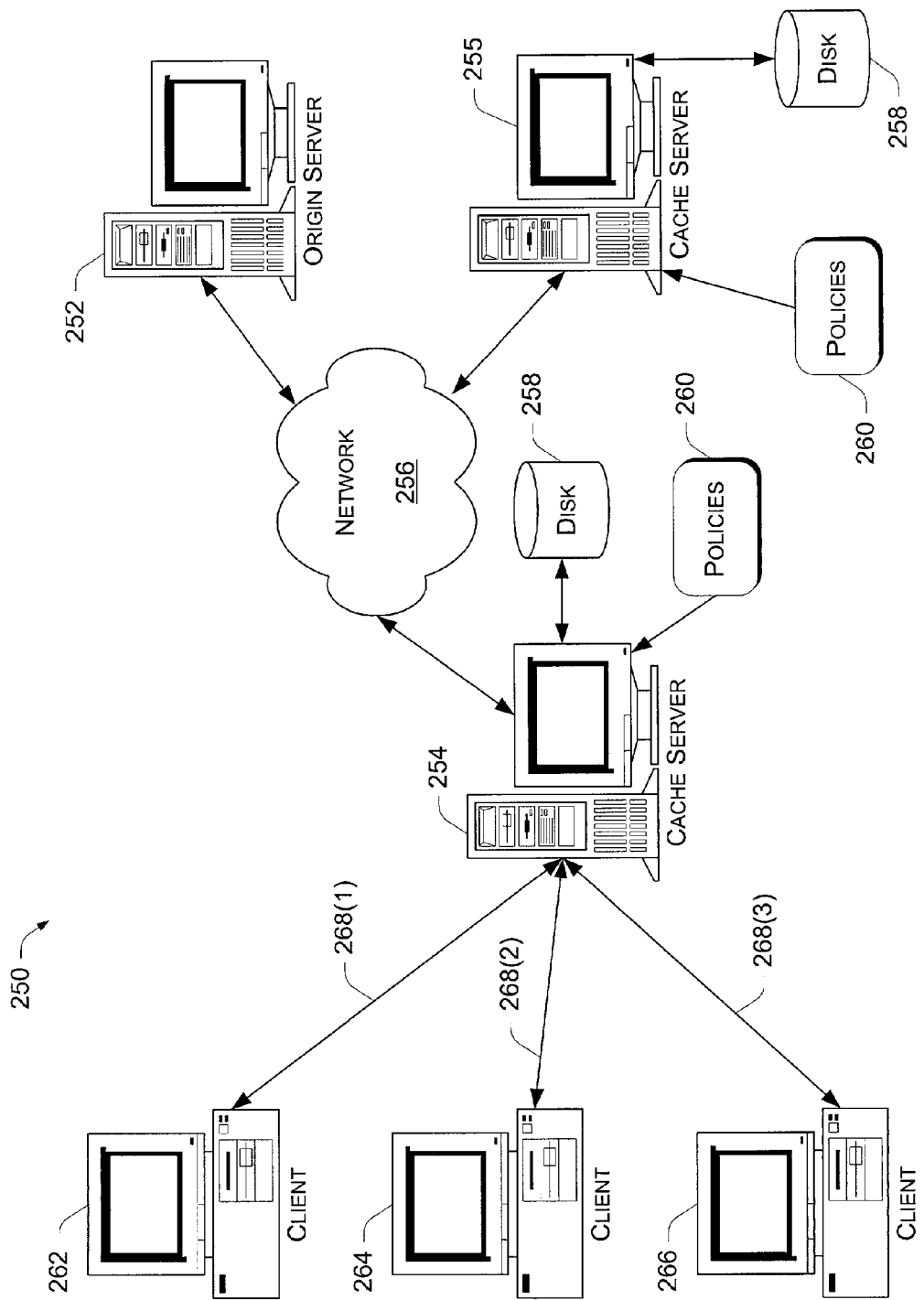
FIG. 3 illustrates another example environment in which data is cached in multiple cache servers.

FIG. 3 illustrates another example environment 250 in which data is cached in multiple cache servers 254 and 255. Each cache server 254 and 255 is accessible to different groups of clients. For example, cache server 254 is accessible to clients 262, 264, and 266 via a communication link 268. Although no clients are shown coupled to cache server 255, the cache server may be accessible to any number of clients. Each cache server 254 and 255 is coupled to network 256. An origin server 252 is also coupled to network 256, which allows content to be downloaded from the origin server across the network to the cache servers 254 and 255. Each cache server 254 and 255 is coupled to a disk storage device 258 and a set of cache policies 260.

In this example, the two sets of cache policies 260 are identical such that the operation of the two cache servers 254 and 255 are the same. Each cache server 254 and 255 stores the same cached content from origin server 252 such that a client could be coupled to either cache server and have access to the same cached content. This configuration assists with the sharing of the content distribution burden on both cache servers 254 and 255. If one cache server is reaching its capacity to distribute content, one or more clients may be redirected to the other cache server to balance the content distribution workload between the two cache servers.

In an alternate embodiment, the cache servers 254 and 255 do not cache the same content. For example, cache server 254 may cache movie content while cache server 255 caches sports and special event content. Although the two cache servers 254 and 255 may provide the same functions, the cache servers may operate in different manners (e.g., caching different types of content) based on differences in the cache policies applied to the cache servers.

Figure 4:
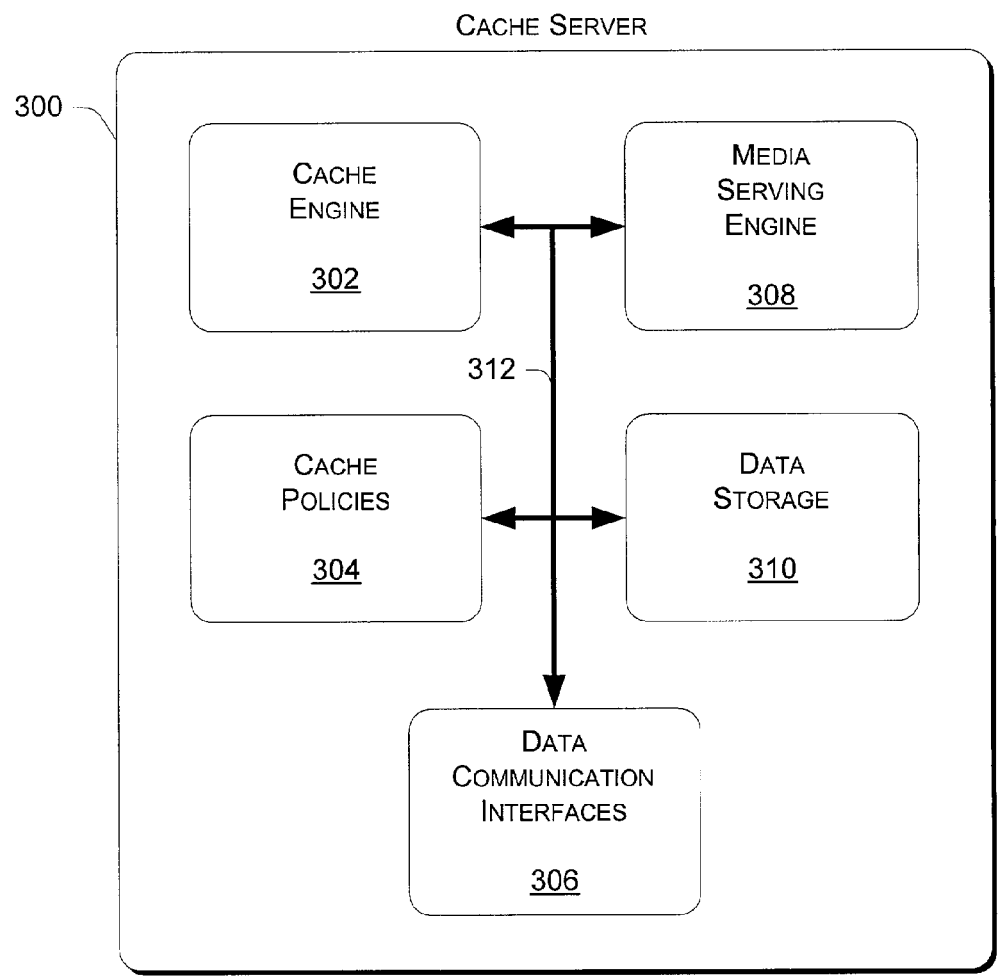
FIG. 4 is a block diagram showing exemplary components in a cache server.

FIG. 4 is a block diagram showing exemplary components in a cache server 300. Cache server 300 includes a cache engine 302 which performs the various functions necessary to cache media content. Example caching functions include downloading media content from an origin server, distributing media content to one or more clients, redirecting clients to a different server for particular media content, and deleting cached media content to release storage space for caching different media content. A set of cache policies 304 are accessed and utilized by the cache engine 302 in performing its various caching functions. For example, cache policies 304 may define when the cache engine should delete cached media content and when the cache engine should download and cache particular media content for expected future access by one or more clients.

In one embodiment, the cache server is a Windows Media Server and the set of cache policies are contained in one or more cache plug-in modules that are loaded in the Windows Media Server and called by the Windows Media Server. Any number of cache plug-in modules can be loaded into the Windows Media Server. The combination of all loaded cache plug-in modules defines the set of cache policies. In one embodiment, the cache plug-in modules are COM objects, which allows the cache plug-in modules to run in the same space as the Windows Media Server. Alternatively, the cache plug-in modules can run as part of another process on the same computer system or on a different computer system that supports the Windows Media Server. Additional cache plug-in modules can be installed by the system administrator at any time and existing cache plug-in modules can be removed by the system administrator at any time, thereby providing flexible management of the cache policies. Thus, the operation of a cache server can be modified simply by changing the cache plug-in modules in the cache server. Additional details regarding the cache policies are provided below.

Cache server 300 includes various data communication interfaces 306, which allow the cache server to interact with other devices, such as clients, origin servers, and other cache servers. Cache server 300 may use any type of data communication interfaces necessary to communicate with other devices. A media serving engine 308 distributes media content to one or more clients or other servers.

Cache server 300 also includes a data storage device 310 for storing data and other information used by the various components of the cache server. Data storage device 310 works in combination with the disk storage device 208 shown in FIG. 2. The various components shown in cache server 300 may be coupled to one another via one or more data communication busses or other communication links, such as bus 312.

By providing a single cache server 300 that can be configured to operate differently using different cache plug-in modules, system administrators or operators only need to understand how to define cache policies in the cache plug-in modules. Administrators need not understand the internal functioning of the cache server. Cache server 300 combines the necessary components to perform a wide variety of functions that are controlled by the cache policies. Thus, different users or manufacturers can build different cache products using the same cache server 300 platform. The cache engine 302 is a general purpose cache engine capable of performing many different cache functions. The system administrator or operator controls those functions with various cache policies 304, which control the operation of the cache engine 302. Thus, the cache server 300 can be "customized" by each system administrator by defining their own set of cache policies 304.

As discussed above, the cache server described herein is capable of performing a set of functions. When and how particular functions are performed is determined by the cache policies. The various functions that a cache server is capable if performing include, for example, downloading content, distributing content, caching content and deleting cached content. The cache policies may determine, for example, how to handle a cache miss, how often to check the "freshness" of cached content, what types of content to cache and when to prefetch content. This flexible cache server architecture allows an administrator to configure a particular cache server to operate in a variety of manners depending on the cache policies associated with the cache server.

As mentioned above, the cache server 300 can operate as an origin server and/or a cache server (i.e., caching content on behalf of other servers). If cache server 300 receives a request for content stored in the cache server, the cache server operates as an origin server by providing the requested content. In this situation, the cache server 300 ignores cache policies because the cache server is operating as an origin server. If cache server 300 receives a request for content stored on a different server, the cache server operates as a cache server by caching content from one or more different servers. In this situation, the cache server 300 applies the various cache policies to process the cached data in the appropriate manner (i.e., the manner defined by the cache policies).

Figure 5:
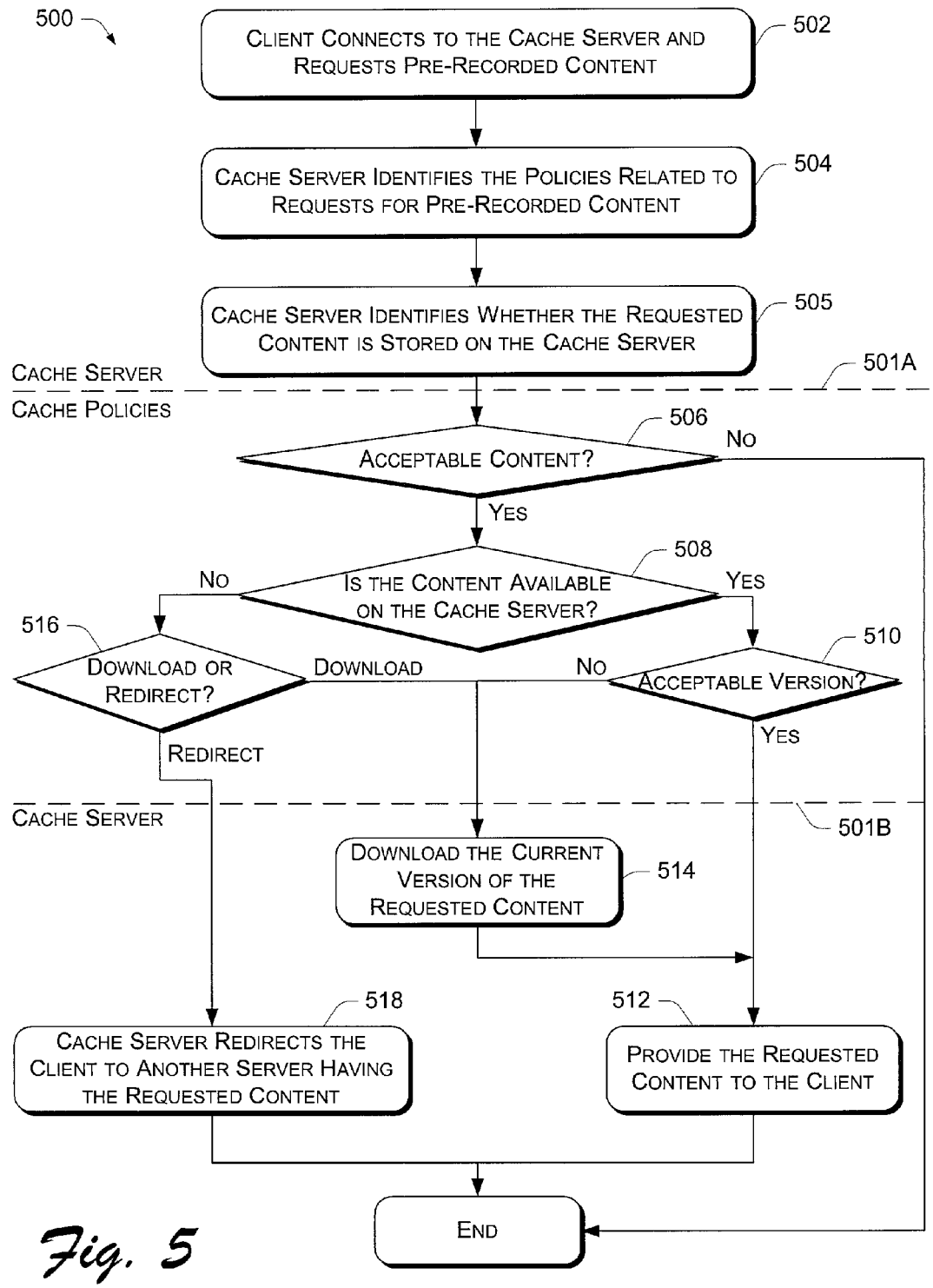
FIG. 5 is a flow diagram illustrating a procedure for handling a client request to receive pre-recorded content.

FIG. 5 is a flow diagram illustrating a procedure 500 for handling a client request to receive pre-recorded content. The procedure 500 illustrates the functions performed by the cache server as well as the decisions made by the cache policies. A pair of broken lines 501A and 501B identify the sections of procedure 500 that represent functions performed by the cache server (the sections above line 501A and below line 501B) and the sections of procedure 500 that represent decisions made by the cache policies (the section between lines 501A and 501B). A client establishes a connection to the cache server and requests pre-recorded content from the cache server (block 502). The cache server identifies the policies related to requests for pre-recorded content (block 504). The cache server then identifies whether the requested content is stored on the cache server (block 505). For example, the cache server may examine a URL associated with the requested content to determine whether the content is available on the cache server or whether the requested content is stored on a different server.

At block 506, the cache policies determine whether the requested content is acceptable (i.e., not blocked due to adult content or other restricted content). If the requested content requires a verification, the procedure requests a name and password from the user for authentication. If the content is blocked or the client does not provide the proper name and password, the policy terminates the procedure without providing any content to the client.

If the content is acceptable at block 506 (or the proper name and password are provided by the client), then the cache policies determine whether the requested content is available on the cache server (block 508). If the requested content is available, then the cache policies determine whether the cached version of the requested content is an acceptable version (block 510). An acceptable version is determined based on the cache policies (e.g., whether the cached version is the same as the origin server's version or is within thirty minutes of the origin server's version). If the cached version is acceptable, the procedure continues to block 512, where the cache server provides the cached version of the requested content to the client. If the cached version of the requested content is not acceptable, then the procedure branches from block 510 to block 514, where the cache server downloads the current version of the requested content from the origin server. In this situation, the client may experience a slight delay in receiving the requested content as the current version is downloaded. However, the client does not necessarily need to wait until the entire current version is downloaded. Instead, the cache server may begin sending the current version of the content as it is received by the cache server (although the image quality may be reduced due to the typically slow communication links between the cache server and the origin server). As the current version is downloaded (or after it has finished downloading), the cache server provides the current version to the client (block 512).

If block 508 determines that the requested content is not available on the cache server, then the cache policies determine whether to download the requested content or redirect the client to a different server (block 516). If the cache policies dictate that the requested content be downloaded, then the procedure branches to block 514, where the cache server downloads the current version of the requested content from the origin server. If the cache policies dictate that the client be redirected to a different server, then the procedure branches to block 518, where the cache server redirects the client to another server having the requested content. The server to which the client is redirected may be another cache server or an origin server. After redirecting the client to another server to retrieve the requested content, the cache server may (depending on the cache server's cache policies) download the previously requested content so that the cache server has a cached version of the content for future client requests.

Figure 6:
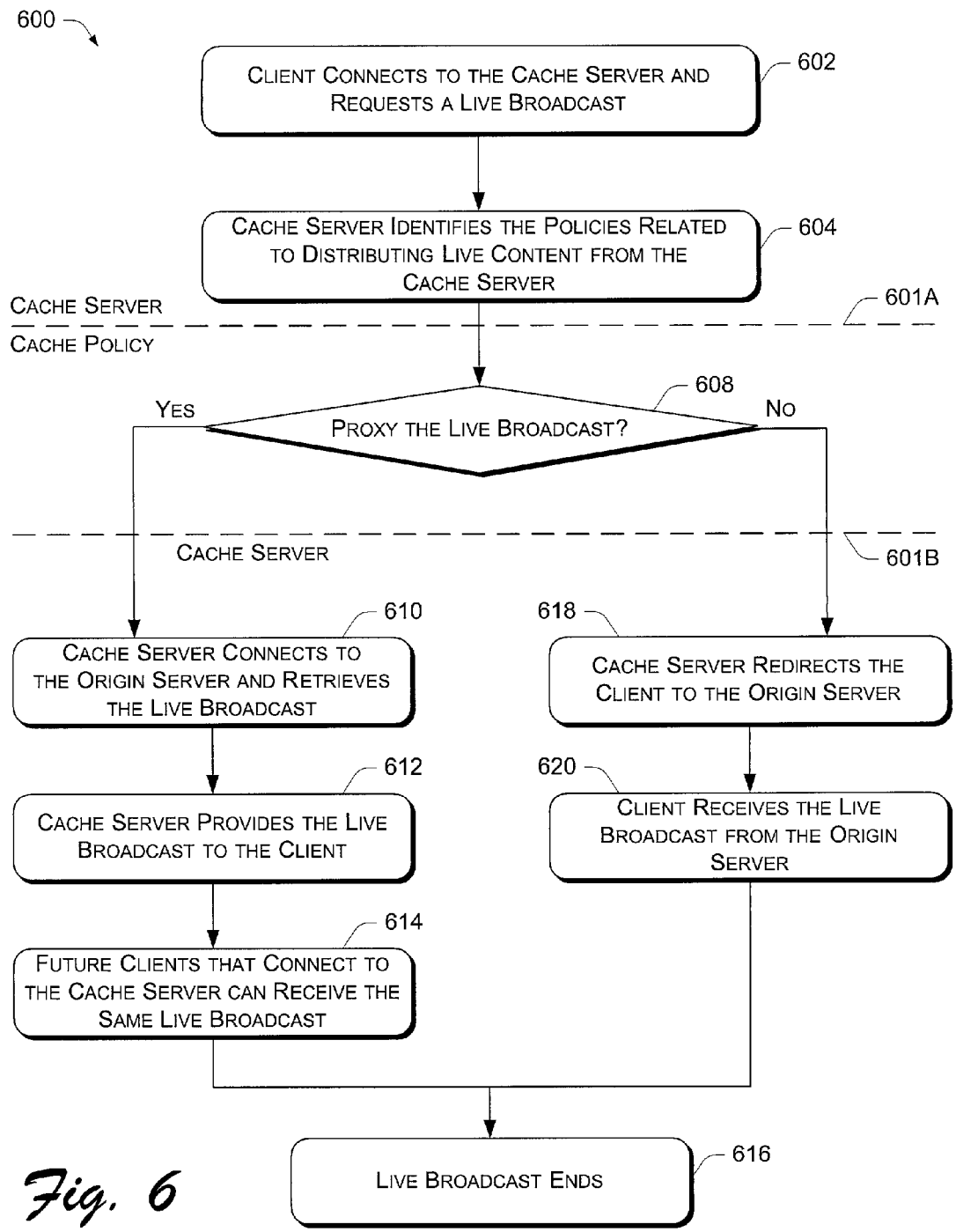
FIG. 6 is a flow diagram illustrating a procedure for handling a client request to receive a live broadcast.

FIG. 6 is a flow diagram illustrating a procedure 600 for handling a client request to receive a live broadcast. The procedure 600 illustrates the functions performed by the cache server as well as the decisions made by the cache policies. A pair of broken lines 601A and 601B identify the sections of procedure 600 that are represent functions performed by the cache server (the sections above line 601A and below line 601B) and the sections of procedure 600 that represent decisions made by the cache policies (the section between lines 601A and 601B).

A client establishes a connection to the cache server and requests a live broadcast from the cache server (block 602). The cache server identifies the policies related to requests for live content (block 604).

The cache policies then determine whether the cache server should proxy the requested live broadcast (block 608). The cache policy may determine not to proxy the requested live broadcast because the bandwidth quotas for the required communication link have been reached.

If the cache policies determine that the cache server will proxy the live broadcast, then the procedure continues to block 610, where the cache server connects to the origin server and establishes a connection to receive the live broadcast. Next, the cache server provides the live broadcast to the client (block 612). Any future clients that connect to the cache server can receive the same live broadcast (block 614) until the live broadcast ends (block 616). In a particular embodiment, the cache server stores (i.e., caches) a copy of the live broadcast for viewing by one or more clients after the live broadcast has ended.

If the cache server will not proxy the live broadcast, then the procedure branches from block 608 to block 618, where the cache server redirects the client to the origin server. The client then receives the live broadcast from the origin server (block 620) until the live broadcast ends (block 616).

The cache policies are typically defined based on an administrator's knowledge of the origin servers, cache servers, clients, networks and other components in the environment in which the cache server is located. Alternatively, the cache policies may have been set by a manufacturer that customizes the cache server and sells the cache server to an end user.

The cache policies may also be based on the administrator's knowledge and/or expectations with respect to, for example, the type of content requests received by the cache server, the volume of requests and the timing of the requests.

Other decisions the cache policies may make include the types of content that should be cached on the cache server. For example, the cache policy may dictate that the cache server can only cache content from specific origin servers (e.g., origin servers owned by a particular company or organization). Additionally, the cache policy may state that the cache server can only cache small pieces of content (that are inexpensive to copy) or only large pieces of content. The cache policy may also limit the total amount of cached content that the cache server can store at any particular time.

Other cache policies determine the frequency with which the cache server checks the freshness of the content stored on the cache server. These policies may also determine whether the cache server is required to have the latest version of the content or whether a "stale" version of the content is sufficient in particular situations.

Another group of cache policies handle cache misses (i.e., the cache server does not contain the requested content). When a cache miss occurs, the cache policy determines how to deliver the requested content to the client. The policy may cause the client to wait while the cache server downloads a copy of the requested content, the client may be redirected to a different cache server, or the client may be redirected to the origin server to retrieve the requested content. When a cache miss occurs, the cache policies will determine whether a copy of the requested content should be cached by the cache server to satisfy future requests for the same content by other clients. If the cache policy determines that the content should be cached by the cache server, then another cache policy may determine whether any of the existing cached content should be deleted to release storage space for the new content. If existing cached content is to be deleted, the cache policy will determine which content should be deleted (e.g., the oldest cached content or the least frequently requested content).

Another set of cache policies determine when to prefetch content. Prefetching content refers to the process of downloading content from an origin server even though a request for the content has not yet been received from a client. For example, a cache server may download a new movie release or the latest news programs from 3:00 a.m. to 6:00 a.m. in anticipation of client requests for the content later in the day. The prefetching policies determine, for example, the content to download from the origin server and the time period during which the content should be downloaded. If necessary, the cache policies determine which content to delete to make room for the prefetched content.

FIG. 7 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 7 shows a general example of a computer 642 that can be used in accordance with the invention. Computer 642 is shown as an example of a computer that can perform the functions of client computer 212–216, cache server 204, or origin server 202 of FIG. 2. Computer 642 includes one or more processors or processing units 644, a system memory 646, and a bus 648 that couples various system components including the system memory 646 to processors 644.

The bus 648 represents one or more of any of several types of bus structures, including a memory bus or memory controller, a peripheral bus, an accelerated graphics port, and a processor or local bus using any of a variety of bus architectures. The system memory 646 includes read only memory (ROM) 650 and random access memory (RAM) 652. A basic input/output system (BIOS) 654, containing the basic routines that help to transfer information between elements within computer 642, such as during start-up, is stored in ROM 650. Computer 642 further includes a hard disk drive 656 for reading from and writing to a hard disk, not shown, connected to bus 648 via a hard disk drive interface 657 (e.g., a SCSI, ATA, or other type of interface); a magnetic disk drive 658 for reading from and writing to a removable magnetic disk 660, connected to bus 648 via a magnetic disk drive interface 661; and an optical disk drive 662 for reading from and/or writing to a removable optical disk 664 such as a CD ROM, DVD, or other optical media, connected to bus 648 via an optical drive interface 665. The drives and their associated computer-readable media provide nonvolatile storage of computer readable instructions, data structures, program modules and other data for computer 642. Although the exemplary environment described herein employs a hard disk, a removable magnetic disk 660 and a removable optical disk 664, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 660, optical disk 664, ROM 650, or RAM 652, including an operating system 670, one or more application programs 672, other program modules 674, and program data 676. A user may enter commands and information into computer 642 through input devices such as keyboard 678 and pointing device 680. Other input devices (not shown) may include a microphone, joystick, game pad, satellite dish, scanner, or the like. These and other input devices are connected to the processing unit 644 through an interface 668 that is coupled to the system bus (e.g., a serial port interface, a parallel port interface, a universal serial bus (USB) interface, etc.). A monitor 684 or other type of display device is also connected to the system bus 648 via an interface, such as a video adapter 686. In addition to the monitor, personal computers typically include other peripheral output devices (not shown) such as speakers and printers.

Computer 642 operates in a networked environment using logical connections to one or more remote computers, such as a remote computer 688. The remote computer 688 may be another personal computer, a server, a router, a network PC, a peer device or other common network node, and typically includes many or all of the elements described above relative to computer 642, although only a memory storage device 690 has been illustrated in FIG. 7. The logical connections depicted in FIG. 7 include a local area network (LAN) 692 and a wide area network (WAN) 694. Such networking environments are commonplace in offices, enterprise-wide computer networks, intranets, and the Internet. In certain embodiments of the invention, computer 642 executes an Internet Web browser program (which may optionally be integrated into the operating system 670) such as the "Internet Explorer" Web browser manufactured and distributed by Microsoft Corporation of Redmond, Wash.

When used in a LAN networking environment, computer 642 is connected to the local network 692 through a network interface or adapter 696. When used in a WAN networking environment, computer 642 typically includes a modem 698 or other means for establishing communications over the wide area network 694, such as the Internet. The modem 698, which may be internal or external, is connected to the system bus 648 via a serial port interface 668. In a networked environment, program modules depicted relative to the personal computer 642, or portions thereof, may be stored in the remote memory storage device. It will be appreciated that the network connections shown are exemplary and other means of establishing a communications link between the computers may be used.

Computer 642 typically includes at least some form of computer readable media. Computer readable media can be any available media that can be accessed by computer 642. By way of example, and not limitation, computer readable media may comprise computer storage media and communication media. Computer storage media includes volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 642. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Thus, a system and method has been described that provide a flexible cache server architecture that is capable of functioning in different manners depending on the set of cache policies that are applied to the cache server.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. An apparatus comprising:
   a media serving engine to distribute media content;
   a cache engine coupled to the media serving engine, the cache engine to cache media content; and
   a set of cache policies accessible by the cache engine to define operation of the cache engine, wherein the apparatus can be initially configured to operate as a cache server based on a first server policy, and wherein the apparatus can be reconfigured to operate as an origin server based on a second server policy defined by a system administrator.

2. An apparatus as recited in claim 1 wherein the cache engine is configured to distribute stored data from a storage device to a plurality of clients.

3. An apparatus as recited in claim 1 wherein the cache engine is configured to distribute cached media content to a plurality of clients.

4. An apparatus as recited in claim 1 further including a data communication interface coupled to the cache engine and the media serving engine.

5. An apparatus as recited in claim 1 further including a data communication interface coupled to allow the cache engine to retrieve media content from an origin server across a network.

6. An apparatus as recited in claim 1 further including a data communication interface coupled to allow the media serving engine to distribute media content across a network.

7. An apparatus as recited in claim 1 wherein the apparatus is a Windows Media Sewer.

8. An apparatus as recited in claim 1 wherein the cache policies include policies for distributing media content from the apparatus.

9. An apparatus as recited in claim 1 wherein the cache policies include policies for handling cache misses.

10. An apparatus as recited in claim 1 wherein the cache policies include policies for prefetching media content.

11. A method comprising:
configuring a cache server based on a first server policy;
receiving a request for media content from a client, wherein the request is received by the cache server;
identifying cache policies associated with a type of media content requested;
determining whether the requested media content is stored by the cache server;
providing the requested media content to the client if the requested media content is stored by the cache server;
redirecting the client to an origin server containing the requested media content if the requested media content is not stored by the cache server; and
reconfiguring the cache server to operate as an origin server in response to receipt of a second server policy, wherein the second server policy is defined by a system administrator.

12. A method as recited in claim 11 further including determining whether the media server receiving the request for media content is functioning as a cache server or an origin server.

13. One or more computer-readable memories containing a computer program that is executable by a processor to perform the method recited in claim 11.

14. A method comprising:
configuring a cache server based on a first server policy;
receiving a request for media content from a client, wherein the request is received by the cache server, wherein the cache server is capable of functioning as an origin server and capable of functioning as a cache server, and wherein the cache server is reconfigured to operate as an origin server by applying a second server policy defined by a system administrator;
processing the request for media content according to a set of cache policies in the cache server if the cache server is functioning as a cache server; and
providing the requested media content to the client if the cache server is functioning as an origin server and the cache server contains the requested media content.

15. A method as recited in claim 14 wherein the set of cache policies includes policies for distributing media content from the cache server.

16. A method as recited in claim 14 wherein the set of cache policies includes policies for storing media content on the cache server.

17. A method as recited in claim 14 further including redirecting the client to an origin server if the cache server is functioning as an origin server and the cache server does not contain the requested media content.

18. A method as recited in claim 14 further including downloading the requested media content from an origin server if the cache server is functioning as an origin server and the cache server does not contain the requested media content.

19. One or more computer-readable memories containing a computer program that is executable by a processor to perform the method recited in claim 14.

20. One or more computer-readable media having stored thereon a computer program that, when executed by one or more processors, causes the one or more processors to:
configure a server as a cache server based on a first server policy, wherein the server can be reconfigured as an origin server by applying a second server policy defined by a user;
receive a request for media content from a client, wherein the request for media content is received by the server;
determine whether the server is operating as a cache server or an origin server;
process the request for media content based on a set of cache policies if the server is operating as a cache server; and
provide the requested media content to the client if the server is operating as an origin server and the server contains the requested media content.

21. One or more computer-readable media as recited in claim 20 wherein the set of cache policies includes policies for media content distribution.

22. One or more computer-readable media as recited in claim 20 wherein the set of cache policies includes policies for storing media content on the server.

23. One or more computer-readable media as recited in claim 20 further causing the one or more processors to redirect the client to an origin server if the server is operating as an origin server and the server does not contain the requested media content.

24. One or more computer-readable media as recited in claim 20 further causing the one or more processors to download the requested media content from an origin server if the server is operating as an origin sewer and the server does not contain the requested media content.

25. A method as recited in claim 11 wherein redirecting the client to an origin server containing the requested media content includes redirecting the request for media content to the origin server containing the requested media content.

26. A method as recited in claim 14 further comprising redirecting the request for media content to an origin server if the cache sewer is functioning as an origin server and the cache server does not contain the requested media content.

* * * * *